(No Model.)

J. K. P. DAUGHTREY.
Machine for Thrashing Peanuts.

No. 237,496. Patented Feb. 8, 1881.

Attest:
Jas. E. Hutchinson
Albert H. Norris

Inventor:
Jos. K. P. Daughtrey,
by James L. Norris,
Atty.

UNITED STATES PATENT OFFICE.

JAMES K. P. DAUGHTREY, OF BUCKHORN, VIRGINIA, ASSIGNOR OF ONE-HALF TO J. THOMAS JUDKINS, OF SAME PLACE.

MACHINE FOR THRASHING PEANUTS.

SPECIFICATION forming part of Letters Patent No. 237,496, dated February 8, 1881.

Application filed November 24, 1880. (No model.)

*To all whom it may concern:*

Be it known that I, JAMES K. P. DAUGHTREY, a citizen of the United States, residing at Buckhorn, in the county of Nansemond, State of Virginia, have invented new and useful Improvements in Apparatus for Thrashing Peanuts, of which the following is a specification.

This invention relates to machines for thrashing peanuts from their vines, and the object of the invention is to provide an exceedingly simple and advantageous arrangement of parts, whereby the machines are rendered less expensive and much more effective in operation than ordinary apparatus for the same purpose.

Heretofore machines for thrashing peanuts have embodied in their construction a rotating reel composed of head-blocks connected by parallel wires or rods, a frame of stretched wires arranged horizontally above the reel, the wires in said frame being arranged at right angles or transverse to the wires of the reel, and a roller arranged above the frame of stretched wires and provided with annular grooves, into which set the stretched wires.

In this arrangement the rotating reel, in its rapid rotation, tends to draw the vines downward through the stretched wire frame, owing to the absence of any abutments or supports for the vines in a line parallel to and extending longitudinally along the reel.

In my invention the vines cannot possibly be drawn down by the rotating reel, and the machine is otherwise rendered very effective in operation.

The present invention consists in the combination, with a rotating reel constructed of heads connected by wires or rods, of a series of stationary spaced wires or rods arranged above and adjacent to the reel, in an arc approximately concentric therewith, and extending longitudinally along in the direction of the length of the reel, whereby such spaced wires or rods serve as transverse abutments or supports to the vines while the reel beats off the peanuts.

Figure 1:
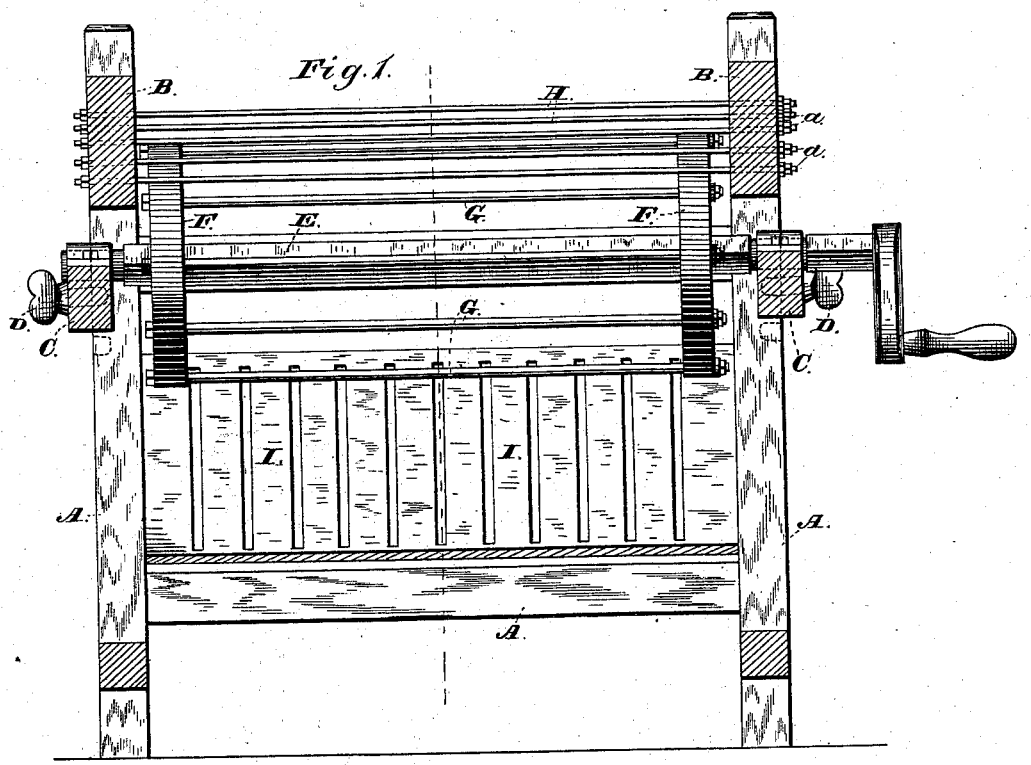
Figure 2:
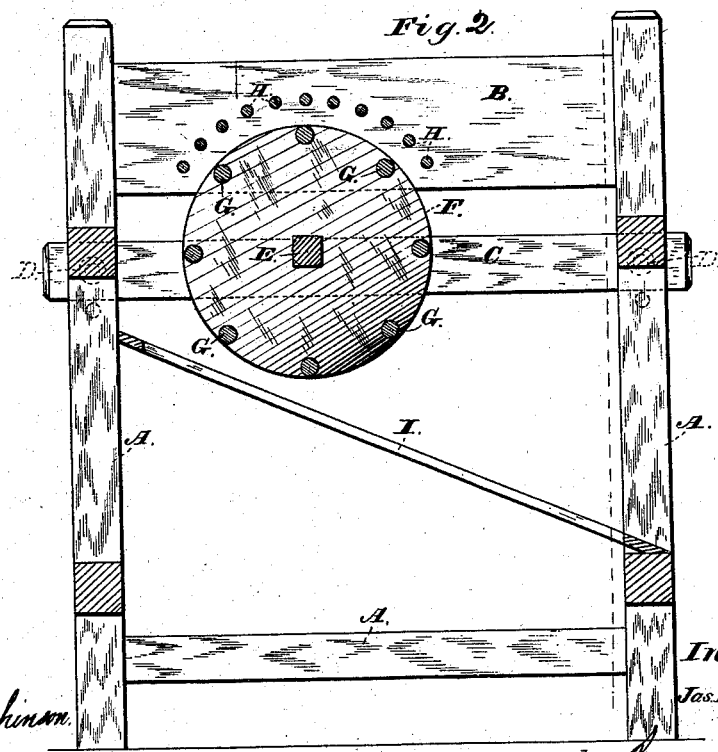

In the accompanying drawings, Figure 1 is a side elevation, partly in section, of a machine constructed according to my invention, and Fig. 2 is a transverse sectional view of the same.

The letter A indicates a frame-work of any suitable construction, provided with transverse end bars, B B and C C. The bars C are supported at each end by set-screws D, which are adapted to holes in the frame A, by which means said bars are capable of vertical adjustment.

The reel is of ordinary construction, being composed of a shaft, E, journaled upon the bars C, and two head-blocks or disks, F, connected by a series of wires or rods, G. These wires or rods are preferably screw-threaded at one end and provided with nuts, by which they can be tightened up.

The letters H H indicate the spaced wires or rods for supporting the vines of the peanuts. These wires or rods pass through the transverse end bars, B, and they extend longitudinally in the direction of the length of the reel and parallel to the wires or rods thereof. The wires H are further arranged in an arc concentric to the axes of the reel, so as to provide a convex support for the vines. In this manner all the peanuts on the vines which project down through the spaces between all of the said wires or rods are subjected to the action of the reel. The tension of the wires or rods H is adjusted by the nuts $a$, which fit screw-threads on the ends of the wires.

In practice the shocks of peanut-vines are laid across the wires or rods H, and the attendant presses said vines down upon the wires to conform to the concentric path in which they are arranged, and the peanuts, hanging through the spaces between the wires, are struck by the wires of the rotating reel and thrashed off. During such operation the vines are prevented from being drawn down through the wires H because the vines are supported transversely on the same, and further, said wires act as transverse abutments to the vines during the thrashing operation.

Below the rotating reel I arrange an open inclined platform or apron, I, to catch the peanuts and direct them to one side of the machine, the open-work of the platform or apron permitting dirt to pass through.

What I claim is—

1. The combination, with the rotating reel of a machine for thrashing peanuts, of a series of spaced stationary wires extending longitudinally in the direction of the length of the cylinder and arranged above the reel in an arc approximately concentric to the axis of the reel, substantially as shown and described.

2. The combination of the rotating reel, arranged in the vertically-adjustable bearings, with the series of spaced wires or rods arranged above said reel, and in an arc approximately concentric to the axis of the reel, substantially as described.

In testimony whereof I have hereunto set my hand in the presence of two subscribing witnesses.

J. K. P. DAUGHTREY.

Witnesses:
  ALBERT H. NORRIS,
  JAMES A. RUTHERFORD.